(No Model.) 3 Sheets—Sheet 1.

L. C. JAQUISH.
BICYCLE.

No. 473,931. Patented May 3, 1892.

Witnesses: Mabel Creighton. John L. Jackson.

Inventor: Louis C. Jaquish
by Bond Adams & Pickard
Attorneys (No Model.) 3 Sheets—Sheet 2.
L. C. JAQUISH.
BICYCLE.
No. 473,931. Patented May 3, 1892.
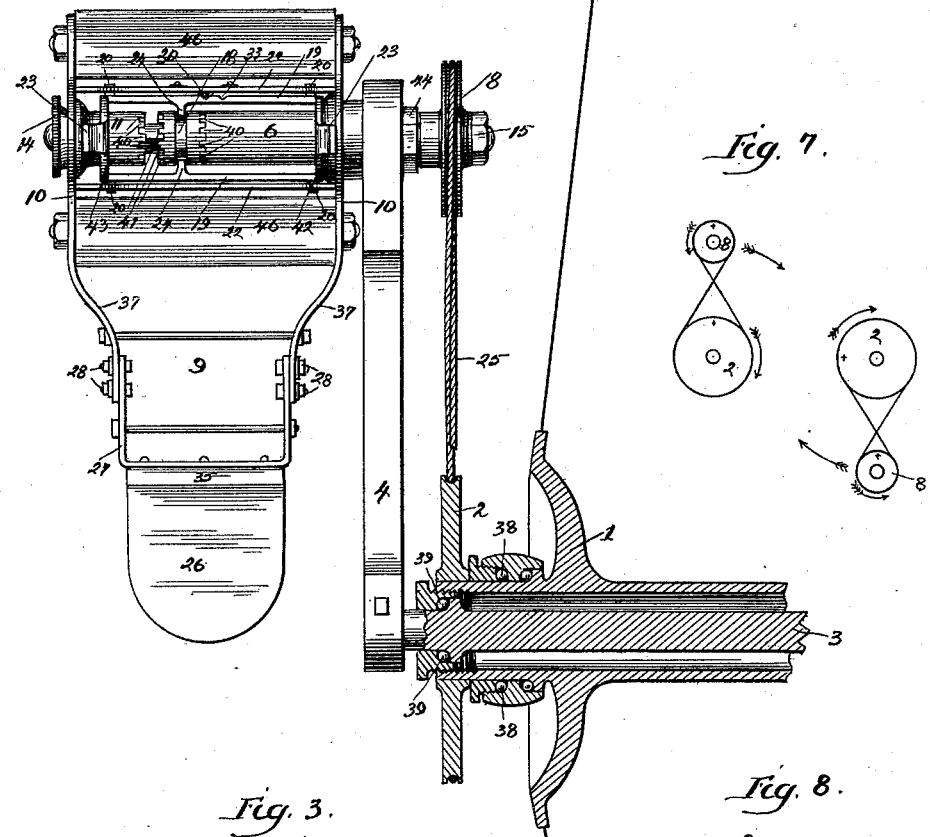
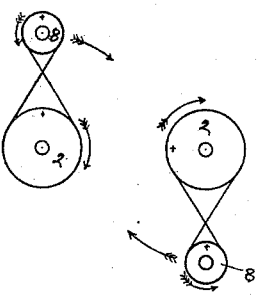
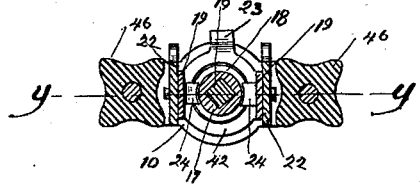
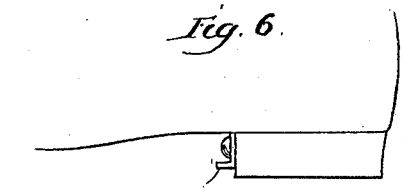
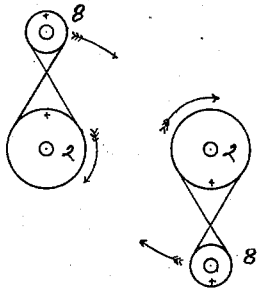
Witnesses:
Mabel Creighton
John L. Jackson
Louis C. Jaquish, Inventor
by Boud Adams Hickard,
Attorneys
THE NORRIS PETERS CO., PHOTO-LITHO., WASHINGTON, D. C.

(No Model.) 3 Sheets—Sheet 3.
L. C. JAQUISH.
BICYCLE.

No. 473,931. Patented May 3, 1892.

Witnesses:
Mabel Creighton
John L. Jackson

Inventor:
Louis C. Jaquish
by Bond, Adams & Pickard
Attorneys.

THE NORRIS PETERS CO., PHOTO-LITHO., WASHINGTON, D. C.

UNITED STATES PATENT OFFICE.

LOUIS C. JAQUISH, OF CHICAGO, ILLINOIS.

BICYCLE.

SPECIFICATION forming part of Letters Patent No. 473,931, dated May 3, 1892.

Application filed December 21, 1891. Serial No. 415,809. (No model.)

*To all whom it may concern:*

Be it known that I, LOUIS C. JAQUISH, a citizen of the United States, residing at Chicago, in the county of Cook and State of Illinois, have invented certain new and useful Improvements in Bicycles, of which the following is a specification, reference being had to the accompanying drawings, in which—

Figure 1:
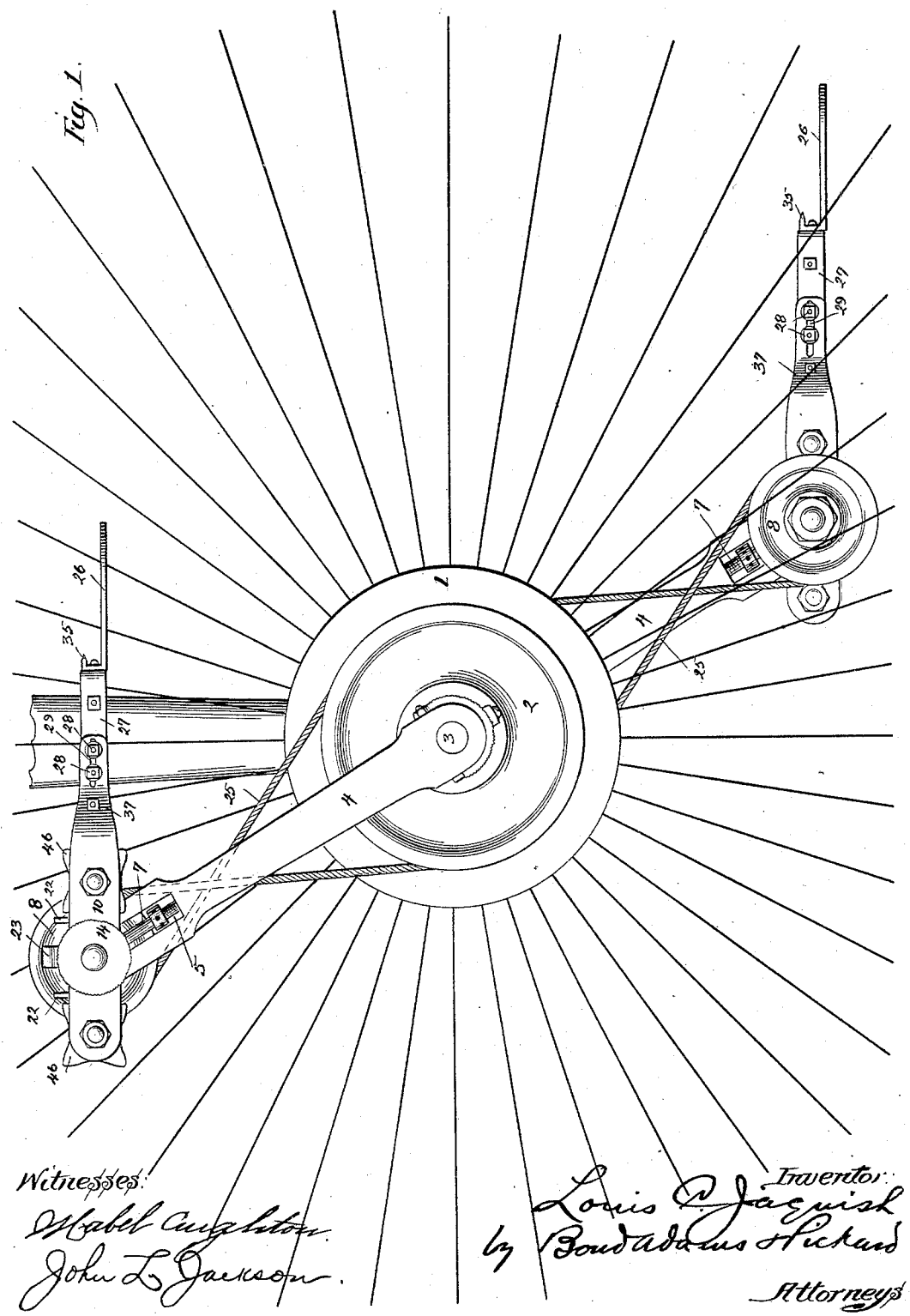
Figure 4:
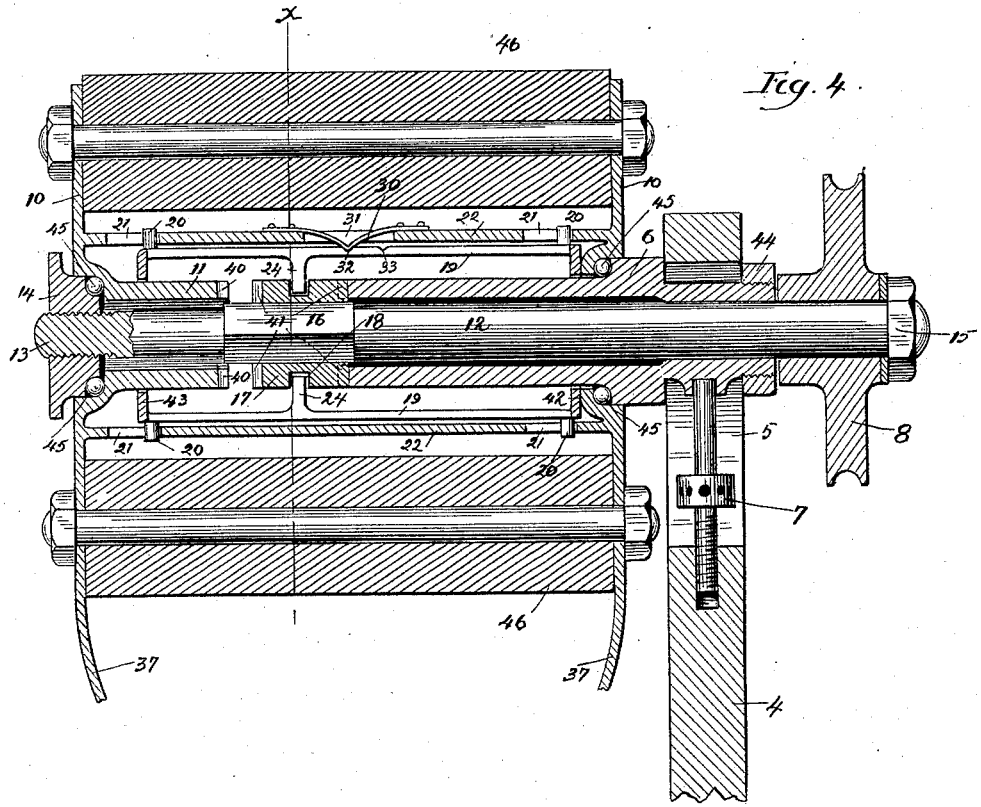
Figure 5:
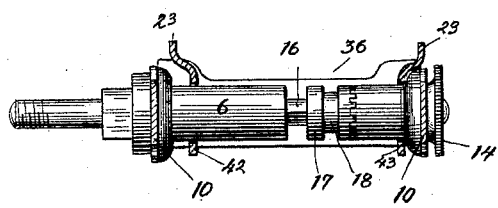

Figure 1 represents a side view of a portion of the front wheel of a bicycle of the type known as the "ordinary" with my devices attached, the arm of the fork upon the near side being removed. Fig. 2 is a plan view, partly in section. Fig. 3 is a cross-section of the pedal upon line $x\ x$ of Fig. 4. Fig. 4 is an enlarged detail, being a horizontal section through the pedal and a portion of the crank on line $y\ y$ of Fig. 3. Fig. 5 is a detail view of the shifting mechanism as used upon one of the pedals. Fig. 6 shows a plate attached to the heel of the shoe of the rider to engage with the heel-plate of the pedal, and Figs. 7 and 8 are diagrams illustrating the revolution of the pulley-wheels.

My invention relates to improvements in bicycles; and its object is to provide a mechanism by which the main wheel of the bicycle may be driven in the ordinary manner—that is to say, may be caused to make one revolution with each revolution of the driving-crank, or, when desired, may be speeded—that is to say, may be caused to make more than one revolution for each revolution of the driving-crank. I accomplish this object as hereinafter specified, and as illustrated in the drawings.

That which I regard as new will be pointed out in the claims.

The drive-wheel of the bicycle is provided with a hollow or sleeve hub 1, which turns in the ordinary ball-bearings 38. To each end of this hollow or sleeve hub is rigidly attached the pulley 2, so that it will rotate with the hub and wheel. Through this hollow or sleeve hub passes an axle 3, revolving in ordinary ball-bearings 39. To each end of the axle 3 is attached the crank 4. The outer end of the crank 4 is provided with a slot 5, in which is placed the hollow pedal-axle 6, secured to the crank by the nut 44 and the adjusting-screw 7 in such way that it is, when in position, rigidly fastened to the crank. The pedal 9 rotates upon this pedal-axle and is provided with the ordinary ball-bearings 45.

The pedal-frame 10 is provided at its outer side with a tube or sleeve 11, formed integral therewith and of approximately the same size and shape as the inner end of the hollow pedal-axle in line therewith. Through the pedal-axle 6 and the tubular projection or sleeve 11 passes the pin 12, secured to the axle and pedal-frame in any appropriate manner, and in the drawings shown as secured by the screw 13, nut 14, and head 15. The inner ends of the hollow pedal-axle 6 and the hollow projection or sleeve 11 do not come together, but leave a space between them. The portion of the pin 12 which comes between the hollow axle 6 and the hollow projection or sleeve 11 is squared, as shown at 16. Upon this squared portion slides the cylindrical block or clutch 17, which is provided with a square hole through the center, fitting over the squared portion of the pin 12, as best shown in Fig. 3. The inner ends of the pedal-axle 6 and the hollow projection or sleeve 11 from the pedal-frame 10 are provided with teeth 40, and the cylindrical block 17 is also provided at each end with teeth 41, fitting into the spaces between the teeth upon the pedal-axle and the hollow projection from the pedal-frame to form a clutch. The cylindrical block or clutch 17 is provided with a circumferential groove 18, running completely around the block 17.

42 43 represent two end pieces of a sliding frame provided with a circular opening at the center of each of such size as to slide freely upon the pedal-axle 6 and hollow projection or sleeve 11, respectively, and fastened together by side bars 19 19, one at each side of pedal-axle 6. The side bars 19 are each provided with two pins 20, adapted to rest in slots 21 of two cross-bars 22 of the pedal-frame, one upon each side of the pedal-axle. The end pieces 42 43 are each provided with a lug 23, projecting upward and above the surface of the pedal, so that the rider may move the sliding frame from side to side by striking his foot against either of these lugs. The side bars 19 are provided each with a projection 24, projecting inwardly from said bar toward the pedal-axle and into the circumferential groove 18 of the cylindrical block or clutch 17, so that when the sliding frame is moved from side to side the cylindrical block or clutch 17 is carried with it, its teeth 41 thus being caused to engage either with the teeth 40 upon the hollow pedal axle 6 or with the teeth 40 upon the hollow projection or sleeve 11. The pin 12 is provided at its inner end with the pulley 8, which may be either formed integral with said pin, or, as shown in the drawings, may be rigidly attached thereto in any appropriate way. The pulley 8 is so arranged as to be in line with the pulley 2, as is clearly shown in Fig. 2. The pulley 2 and the pulley 8 are geared together by means of rope, chain, belt, cable, or any other suitable gearing. I prefer to connect the pulleys by the crossed cable 25, and it is so shown in the drawings.

The pedal-frame 10 is provided with two arms 37 37, extending backward, and each is provided with a slot 39 (see Fig. 1) near its rearward end.

27 indicates a metal bar, bent twice at right angles and adapted to be fastened to the arms 37 by means of the bolts 28, which pass through the bar 27 and through the slots 29 of the arms 37, so as to adjust the length of the frame to the foot of the rider.

26 indicates a heel-plate, preferably formed of a single piece of sheet metal and of the shape indicated in Fig. 2. The forward end is bent twice at right angles, as is shown in Fig. 1, to form a projection 35, adapted to engage with a plate 34 upon the boot-heel of the rider, as hereinafter described. The heel-plate is secured to the bent metal bar 27 by bolts or by other appropriate fastenings. The heel-plate assists the rider in holding the pedal in a fixed position when the pedal engages with the cylindrical block or clutch 17 and the pulley 8.

When it is desired to drive the machine in the ordinary way, so as to cause the driving-wheel to make one revolution with each revolution of the pedal-crank, each foot of the rider is moved inwardly toward the driving-wheel of the machine against the inner projection or lug 23. This causes the frame 19 to move inwardly, carrying with it the cylindrical block or clutch 17, whose teeth engage with the teeth upon the outer end of the pedal-axle 6. By this means the pedal-pin 12, with its attached pulley 8, is so engaged with the pedal-axle 6 that the pulley 8 does not change its position with reference to the crank as the crank revolves. This is shown in the diagram Fig. 8, where the stars marked upon the pulley 2 and the pulley 8 are shown as preserving the same relation with one another. In this way, by means of the connecting-belt 25, the pulley 2 is revolved with the pedal-crank and the driving-wheel of the bicycle is caused to make one revolution with each revolution of the crank and in the same direction.

When it is desired to speed the machine—that is, to cause the driving-wheel to make more than one revolution with each revolution of the pedal-crank—each foot of the rider is pushed outward against the outer projection or lug 23 of the frame 19. This moves the frame 19 outward, carrying with it the cylindrical block 17, disengaging it from the teeth upon the pedal-axle 6 and engaging the teeth upon the outer end of the block 17 with the teeth upon the inner end of the hollow projection or sleeve 11 of the pedal-frame 10. This causes the pin 12, with its attached pulley 8, to become engaged with the pedal and its frame instead of with the pedal-axle. The foot of the rider, resting upon the pedal with the heel upon the heel-plate 26, causes the pedal to be kept in a fixed position in its revolution with the pedal-shaft about the crank-shaft 3. This, it will be seen, is equivalent to giving the pulley 8 in each revolution of the crank a revolution about its own axis in a direction opposite to the revolution of the crank, as is shown in the diagram Fig. 7. By means of the belt 25 this motion is communicated to the pulley 2, and by the crossing of the belt the motion is reversed to a motion in the same direction as that given to the pulley 2 by the revolution of the driving-crank and additional thereto. The pulley 2 will thus be rotated, in addition to the revolution caused by the movement of the pedal-crank, by an amount depending upon the comparative diameters of the two pulleys. If, for instance, the pulley 8 is one-half the diameter of the pulley 2, the pulley 2, in addition to each revolution caused by the revolution of the pedal-crank, will be given one-half of a revolution by the action of the pulley 8.

In order to guard against the failure to engage both sides of the wheel at once when the shift is made from the ordinary revolution of the wheel to the speeding arrangement, I make the cylindrical block or clutch 17 upon one pedal without any projecting teeth upon its inner end, and also make the pedal-axle upon the same pedal without such projecting teeth, as is shown in the detail, Fig. 5. Thus the pedal upon one side will cause the revolution of the wheel, either speeded or otherwise, according to the engagement, without danger of the other side being engaged in a different manner until the desired engagement is made upon the other side with the speeding mechanism.

In order to prevent the foot of the rider while riding from accidentally slipping from one side to the other and thus disengaging the block 17, I make the cross-bars 22 of the pedal-frame somewhat wider than the thickness of the rubber treadles 46. That portion which thus projects upward and above the surface of the rubber treadles is cut away in the middle, forming a depression 36, Fig. 5, somewhat less in width than the space between the lugs 23 and with the bottom of the depression on a level with the upper surface of the rubber treadle 46. The toe of the rider's shoe rests in this depression, and thus will not slip to one side or the other, so as to strike the lugs 23.

In order to still further fix the shifting device in the position in which it may be set and prevent its slipping, I provide a spring 30, attached to one cross-bar 22 of the pedal-frame 10 and bent in the middle into a point, which projects inwardly through the slot 31 in the pedal-frame. The shifting frame 19 is provided with two depressions 32 33 at a distance from one another equal to the lateral movement of the frame 19, into which depressions the point of the spring 30 projects. These depressions are so arranged that the depression 32 will come opposite the point of the spring when the shifting frame 19 is at one side, and the depression 33 will come opposite the point of said spring when the shifting frame is moved to the other side. The spring 30 is made stiff enough to hold the shifting frame in position, but at the same time not stiff enough to materially interfere with the lateral movement of the frame when shifted by the rider from one side to the other.

In case the machine is reversed while the speeding device is in operation, in order to prevent the pedal with its heel-plate 26 being thrown down, it will be advisable for the rider to attach to the heel of his shoe the plate 34, which is bent in the form of angle-iron with the horizontal portion projecting forward. This forward projection of the heel-plate 34 will engage with the rearward-projecting portion 35 of the heel-plate 26, thus preventing the pedal from being thrown down. If the belt 25 in working the machine slips upon the pulleys 2 and 8, it is desirable either to mill the grooves in the pulleys 2 and 8 or to wrap the driving-belt once or more around one or both of the pulleys.

In the drawings I have shown the portion of the pin 12 coming in the space between the end of the hollow pedal-axle 6 and the sleeve 11, upon which the cylindrical block or clutch 17 slides as squared. It is obvious, however, that this portion of the pin may be either polygonal in section or anything but circular, so as to prevent the rotation of the cylindrical block or clutch 17 independently of said pin 12.

That which I claim as new, and desire to secure by Letters Patent, is—

1. The combination, with a pulley and a crank rotating about the same axis as the pulley, but independently thereof, of mechanism for rotating said pulley by the rotation of said crank and mechanism for giving an additional speed to said pulley, substantially as described.

2. The combination, with a pulley and a crank rotating about the same axis as the pulley, but independently thereof, of a second pulley carried by said crank, said pulleys being geared together, and mechanism for causing said second pulley to give an additional speed to the first pulley, substantially as described.

3. The combination, with a crank and a pulley rotating upon the same axis and adapted to rotate at a greater speed than the crank, of devices for rotating said pulley by the rotation of said crank and mechanism for accelerating the speed of said pulley independently of said crank, substantially as specified.

4. The combination, with a pulley and a crank rotating about the same axis as the pulley, but independently thereof, of a second pulley carried by said crank and geared to said first pulley and mechanism for holding said second pulley in a fixed position in its revolution with the crank about the crank-axis, substantially as described.

5. The combination, with a pulley and a crank rotating about the same axis as the pulley, but independently thereof, of a second pulley secured at the end of the crank and geared to the first pulley, devices adapted to hold said second pulley in a fixed position in its revolution with the crank about the crank axis, and devices for locking said second pulley to the crank, substantially as described.

6. The combination, with a main wheel having a hollow hub, of a crank journaled in said hub, a hollow pedal-axle carried by said crank, a pin journaled in said pedal-axle, gearing connecting said pin with the hub of the main wheel, and devices for locking said pin to the crank and for releasing it, substantially as described.

7. The combination, with a main wheel having a hollow hub, a pulley mounted upon and rigidly attached to said hub, of a crank journaled in said hub, a hollow pedal-axle carried by said crank, a pin journaled in said pedal-axle, a pulley mounted upon and rigidly connected with said pin, gearing connecting said two pulleys, a foot-pedal, and means for locking said pin to the foot-pedal, substantially as described.

8. The combination, with a main wheel having a hollow hub, a pulley mounted upon and rigidly attached to said hub, of a crank journaled in said hub, a hollow pedal-axle carried by said crank, a pin journaled in said pedal-axle, a pulley mounted upon and rigidly connected with said pin, gearing connecting said two pulleys, a foot-pedal, means for locking said pin to the foot-pedal, and means for locking said pin to the pedal-axle, substantially as described.

9. The combination, with the main wheel of a bicycle, having a hollow hub, a shaft journaled in said hub, a crank mounted upon said shaft, a hollow pedal-axle carried by said crank, a pin journaled in said pedal-axle, and gearing connecting said pin and the hub of the main wheel, of a foot-pedal mounted upon said pedal-axle, and a clutch operated from said foot-pedal to lock said pin either to the foot-pedal or to the pedal-axle, substantially as described.

10. The combination, with the main wheel of a bicycle, having a hollow hub, a shaft journaled in said hub, a crank mounted upon said shaft, a hollow pedal-axle carried by said crank, a pin journaled in said pedal-axle, and gearing connecting said pin and the hub of the main wheel, of a foot-pedal mounted upon said pedal-axle, a clutch having a peripheral groove, a sliding frame mounted in the foot-pedal and having projections 24 adapted to fit into the groove in the clutch, and upward-projecting lugs 23, adapted to be engaged by the foot of the rider, whereby the sliding frame may be moved transversely of the pedal, substantially as described.

11. The combination, with the main wheel of a bicycle, having a hollow hub 1, a shaft 3, journaled in said hub, a crank 4, mounted upon said shaft, a hollow pedal-axle 6, carried by said crank and having teeth 40 on its outer end, a pin 12, journaled in said pedal-axle 6 and having a polygonal portion 16, and gearing connecting said pin and the hub of the main wheel, of a foot-pedal mounted upon said pedal-axle 6 and having a sleeve 11, said sleeve having teeth 40 upon its inner end, a clutch 17, having teeth 41 upon each end, adapted to mesh with the teeth 40, said clutch being mounted upon said polygonal portion 16 of the pin 12, and devices for throwing said clutch into engagement either with said pedal-axle 6 or with the sleeve 11, substantially as described.

12. In a bicycle, the combination, with a main wheel having a hollow hub 1, a shaft 3, journaled in said hub, a crank 4, mounted upon said shaft, a hollow pedal-axle 6, carried by said crank and having teeth 40 upon its outer end, a pin 12, journaled in said pedal-axle, gearing connecting said pin with the hub 1, said pin having the squared portion 16, of a pedal 9, mounted upon said pedal-axle and having a rearward-extending frame 37 and a heel-plate 26, a sleeve 11, formed integral with the pedal-frame and having teeth 40 on its inner end, a clutch 17, sliding upon the squared portion 16 of the pin 12 and having a peripheral groove 18 and teeth 41, a sliding frame mounted in the pedal-frame and having inward projections 24, notches 32 and 33, and lugs 23, and a spring 30, adapted to engage the notches 32 and 33, substantially as described.

LOUIS C. JAQUISH.

Witnesses:
ALBERT H. ADAMS,
CHARLES E. PICKARD.